INVENTOR
RUSSELL P. KUHN

United States Patent Office 3,715,168
Patented Feb. 6, 1973

3,715,168
DIE STOCK (HOLDER) AND EXTENSION
Russell P. Kuhn, 109 Tesing Circle,
Bridgeport, Conn. 06606
Filed Feb. 9, 1971, Ser. No. 113,903
Int. Cl. B23b 31/10, 13/06
U.S. Cl. 408—239                3 Claims

ABSTRACT OF THE DISCLOSURE

A die stock holder and extension set which includes a separate die stock for supporting a thread cutting die, the die stock being engageable either directly to a socket wrench or to an elongated extension which in turn is engaged to the socket wrench.

This invention relates generally to die stocks.

A principal object of the present invention is to provide a die stock that is designed to be used in places where an ordinary, conventional die stock cannot be used.

More specifically, another object is to provide a die stock for use where ordinary stock cannot be used such as on bolts or rods below the surface, but accessible on bolts located in internal corners, to chase (rethread) bolts on an engine without removing the surrounding bolts.

Yet another object is to provide a die stock which forms a component in a set that includes a die stock extension, and wherein, when used with the extension, permits the threading of longer bolts.

Yet a further object is to provide a die stock that can be used with a ¼, ⅜, ½ inch and other sizes of drive socket wrenches.

Other objects are to provide a die stock which is simple in design, inexpensive to manufacture, rugged in construction, easy to use and efficient in operation.

These and other objects will be readily evident upon a study of the following specification and the accompanying drawing wherein.

Figure 1:
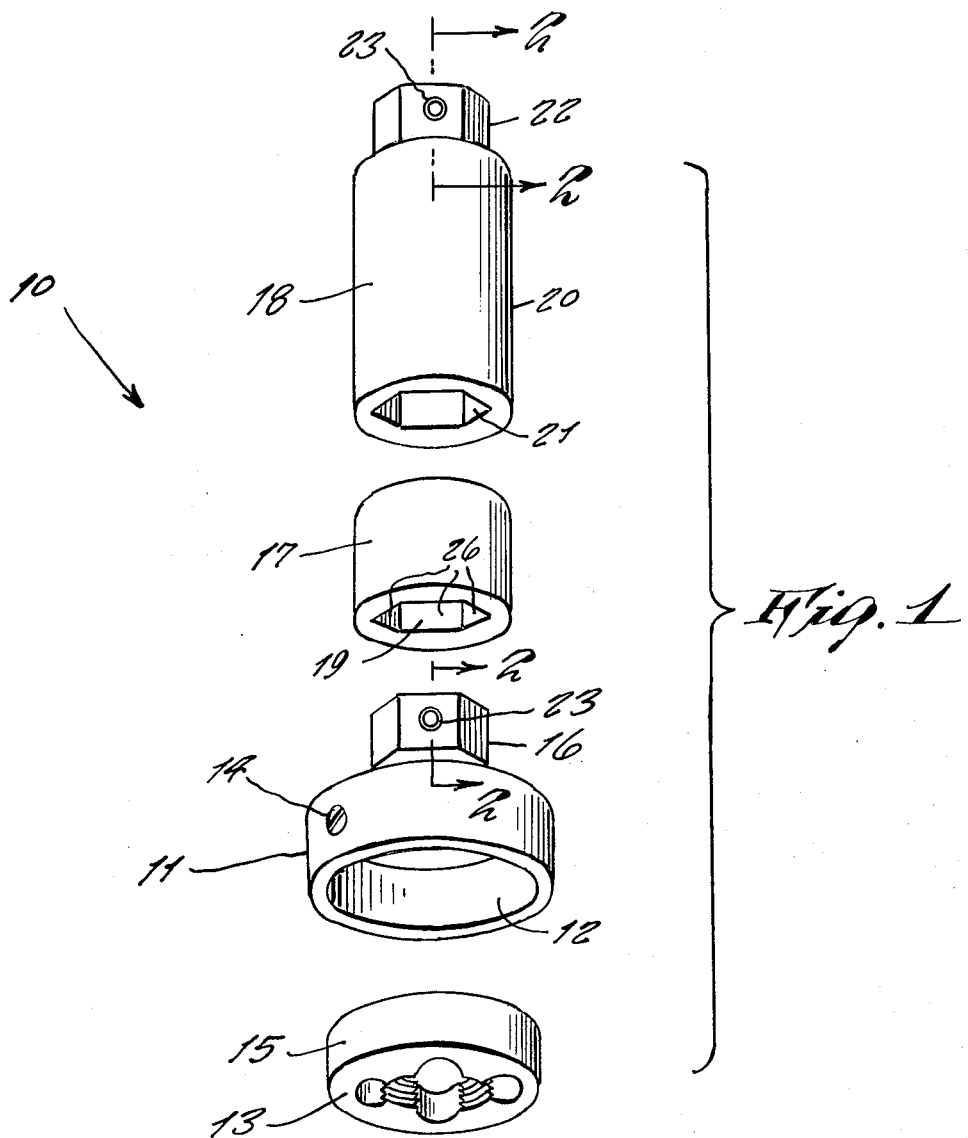
FIG. 1 is an exploded perspective view of the components of the present invention.

Referring now to the drawing in detail, the reference numeral 10 represents a die stock holder and extension set according to the present invention wherein there is a die stock 11 that includes a circular socket 12 at one end thereof for receiving a conventional die 13 used for cutting external threads. A radially extending set screw 14 is threadingly engaged through a side wall of the die stock 11 so to bear against the outer side 15 of the die 13 when fitted into the socket 12, so to fixedly secure the die to the die stock. At its opposite end, the die stock has a protruding hex head 16.

The hex head 16 is adaptable for being selectively secured either to a socket wrench 17 or to a die stock extension 18, which then is attached to a socket wrench 17 at its opposite end.

The socket wrench 17 includes a hex socket 19 at its one end and into which the hex head 16 is receivable.

The die stock extension 18 comprises a relatively elongated member having a longitudinal body 20 which at one end is provided with a hex socket 21 for receiving the hex head 16, the opposite end of the extension having a hex head 22 of a same size as the hex head 16.

Figure 2:
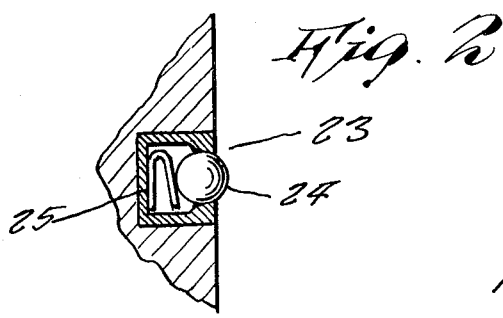
FIG. 2 is a cross sectional view taken on line 2—2 of FIG. 1.

As shown in FIG. 2, it is to be noted that each of the hex heads 16 and 22 are provided with a detent 23 in a side face thereof wherein a spherical steel ball 24 is outwardly urged by a spring 25 so to firmly hold against the socket wrench socket side wall 26. The socket 19 of the wrench may be provided with a complementary recess on all faces of the side wall 26 and into which the detent will readily snap for engagement.

In operative use, it is now evident there is provided a die stock that serves a novel and useful purpose.

While various changes may be made in the detail construction, it is to be understood that such changes will be within the spirit and scope of the present invention.

I claim:

1. A die stock holder comprising a holder having a cylindrical wall enclosing a socket at one end adapted to receive snugly therein a cylindrical thread cutting die, including a solid head integral with said holder at the opposite end axially aligned with said socket, said head having symmetrical polygonal faces parallel to said wall and radially offset from said wall, including a ball mounted in a detent in said head, said ball being resiliently urged radially outward of one of said faces, further including externally actuated means mounted in said wall for retaining the die in said socket.

2. A die stock holder as in claim 1 in combination with a socket wrench extension having a polygonal socket at one end adapted to receive snugly and axially the said head of the holder, including spherical detent within said polygonal socket adapted to receive said ball extending from a face of said head whereby the extension and said head will be in firm resilient engagement.

3. The combination in claim 2 including an integral externally polygonal head provided at the opposite end of said extension in axial alignment with said die holder having external faces that are in the same planes as the faces of the first said head on the die holder.

References Cited

UNITED STATES PATENTS

| 2,855,613 | 10/1958 | Kosta | 10—123 R X |
| 1,667,661 | 4/1928 | Grasley | 81—121 R |
| 2,914,332 | 11/1959 | Cervini | 408—239 X |

GIL WEIDENFELD, Primary Examiner

U.S. Cl. X.R.
81—121 R, 177 G